US012550997B2

(12) United States Patent
Charraud et al.

(10) Patent No.: US 12,550,997 B2
(45) Date of Patent: Feb. 17, 2026

(54) VISUAL ASSISTANCE FOR PRECISE BEAUTY TOOL POSITIONING AND SELF APPLICATION AT HOME

(71) Applicant: L'OREAL, Paris (FR)

(72) Inventors: Gregoire Charraud, Jersey City, NJ (US); Haruna Peyret, Campbell, CA (US)

(73) Assignee: L'Oreal, Paris (FR)

( * ) Notice: Subject to any disclaimer, the term of this patent is extended or adjusted under 35 U.S.C. 154(b) by 638 days.

(21) Appl. No.: 18/051,426

(22) Filed: Oct. 31, 2022

(65) Prior Publication Data
US 2024/0138543 A1 May 2, 2024

(51) Int. Cl.
A45D 40/00 (2006.01)
A45D 44/00 (2006.01)
B05B 12/12 (2006.01)
G06V 40/16 (2022.01)

(52) U.S. Cl.
CPC ............... A45D 40/00 (2013.01); B05B 12/12 (2013.01); B05B 12/124 (2013.01); A45D 2044/007 (2013.01); A45D 2200/057 (2013.01); G06V 40/16 (2022.01)

(58) Field of Classification Search
CPC ............... A45D 40/00; A45D 2044/007; A45D 2200/057; B05B 12/12; B05B 12/124; G06V 40/16
See application file for complete search history.

(56) References Cited

U.S. PATENT DOCUMENTS 10,071,233 B2   9/2018  Casasanta, III et al.
11,257,137 B2*  2/2022  Ford .................... A61K 8/9789
2015/0032092 A1* 1/2015 Adanny ................. A61B 18/14
                                                         606/9
2019/0285772 A1* 9/2019 Yonetani ................ G02B 1/041
2020/0281340 A1* 9/2020 Matsuda .................. A61K 8/02
2022/0150381 A1* 5/2022 Walia ........................ G06T 7/13
2022/0159168 A1* 5/2022 Yu ........................... G06V 10/14
2022/0240650 A1* 8/2022 Malaprade ........... A45D 44/005
2023/0233871 A1* 7/2023 Jafarzadeh .......... A61M 35/003
                                                         601/17

FOREIGN PATENT DOCUMENTS

EP       3560376 A1    10/2019
FR       2933585 A1     1/2010
WO    2014035793 A1     3/2014

OTHER PUBLICATIONS

Preliminary Search Report and Written Opinion mailed Aug. 3, 2023, issued in corresponding French Application No. 2300487, 7 pages.
International Preliminary Report on Patentability mailed May 15, 2025, issued in corresponding international Application No. PCT/EP2023/080178, filed Oct. 30, 2023, 8 pages.

* cited by examiner

Primary Examiner — Michael Collins
(74) Attorney, Agent, or Firm — Christensen O'Connor Johnson Kindness PLLC

(57) ABSTRACT

A hand-held dispenser device includes a dispensing nozzle, wherein the dispensing nozzle is configured to point toward a dispensing direction, a camera configured to receive an image of a dispensing zone that the dispensing nozzle points toward, and a viewfinder that displays the image of the dispensing zone that the dispensing nozzle points toward. The camera and viewfinder enable the user to precisely point the device to treat a desired area.

14 Claims, 6 Drawing Sheets

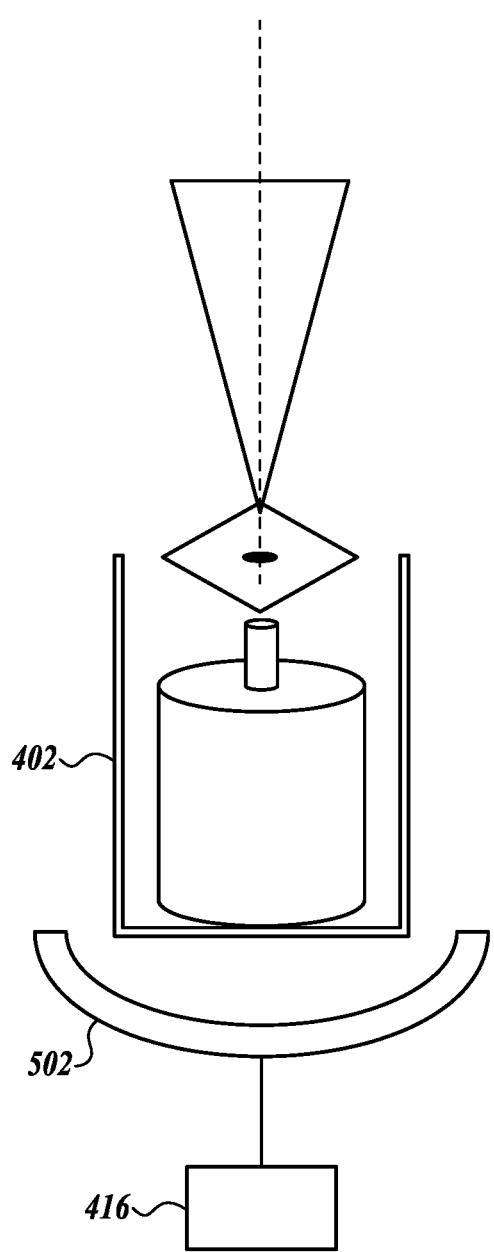 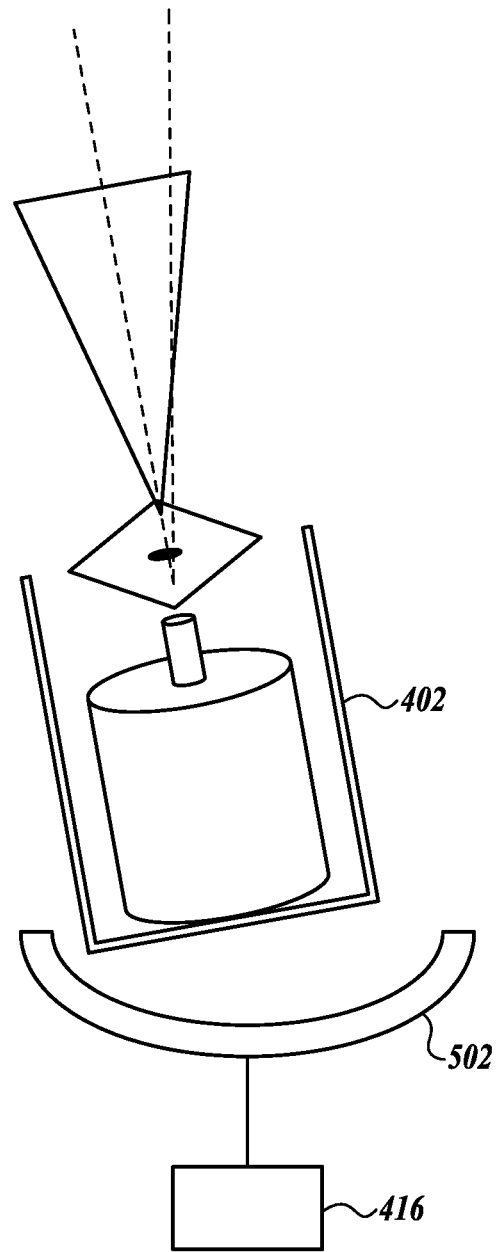
FIG. 5A  FIG. 5B

VISUAL ASSISTANCE FOR PRECISE BEAUTY TOOL POSITIONING AND SELF APPLICATION AT HOME

SUMMARY

This disclosure relates to hand-held dispenser devices including an optical system on the device to enable the user to precisely point the device to treat the desired area.

In one embodiment a dispenser device comprises a dispensing nozzle, wherein the dispensing nozzle is configured to point toward a dispensing direction; a camera configured to receive an image of a dispensing zone that the dispensing nozzle points toward; and a viewfinder that displays the image of the dispensing zone that the dispensing nozzle points toward.

In one embodiment, the camera includes one or more mirrors that reflect the image to the viewfinder.

In one embodiment, the viewfinder includes a mirror or a lens.

In one embodiment, the camera includes a lens and an image sensor that converts light into electronic signals, and the viewfinder includes an electronic display that displays the image created from the image sensor.

In one embodiment, the dispenser device further comprises an automated focusing camera.

In one embodiment, the dispenser device further comprises a motor connected to the dispensing nozzle, the motor is actuated to change a direction of the dispensing direction.

In one embodiment, the dispenser device further comprises a plurality of dispensing nozzles, and the plurality of dispensing nozzles are actuated independently or any two or more simultaneously or in series.

In one embodiment, the dispenser device further comprises one or more lights to illuminate the dispensing zone.

In one embodiment, the dispenser device further comprises a sensor that determines a distance of the dispensing nozzle to the dispensing zone.

In one embodiment, the dispenser device further comprises a sensor that determines skin contact with the dispenser device.

In one embodiment, the dispenser device further comprises a sensor that determines a stability of the dispenser device is within a minimal movement threshold.

In one embodiment, the dispenser device further comprises a sensor that determines a skin tone in the dispensing zone.

In one embodiment, the dispenser device further comprises a flow sensor that determines an amount of a formulation being dispensed.

In one embodiment, the dispensing zone is an area of skin surface including a skin condition.

In one embodiment, the skin condition includes a dark spot, skin wrinkle, or pimple.

In one embodiment, the viewfinder displays a video stream of the dispensing zone.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5A is a schematic illustration of one embodiment of a dispensing nozzle;

FIG. 5B is a schematic illustration of one embodiment of a dispensing nozzle.

DETAILED DESCRIPTION

Hand-held devices, especially for applying facial skin treatments and cosmetics on oneself are difficult to position on a precise area. This is especially true for the application of spray actives on a specific facial area. The user needs to observe his gesture in a mirror and the device itself often gets in the way of viewing the zone that is being treated.

This disclosure relates to hand-held dispenser devices including an optical system on the device to enable the user to precisely point the dispenser device to treat the desired area.

Figure 1:
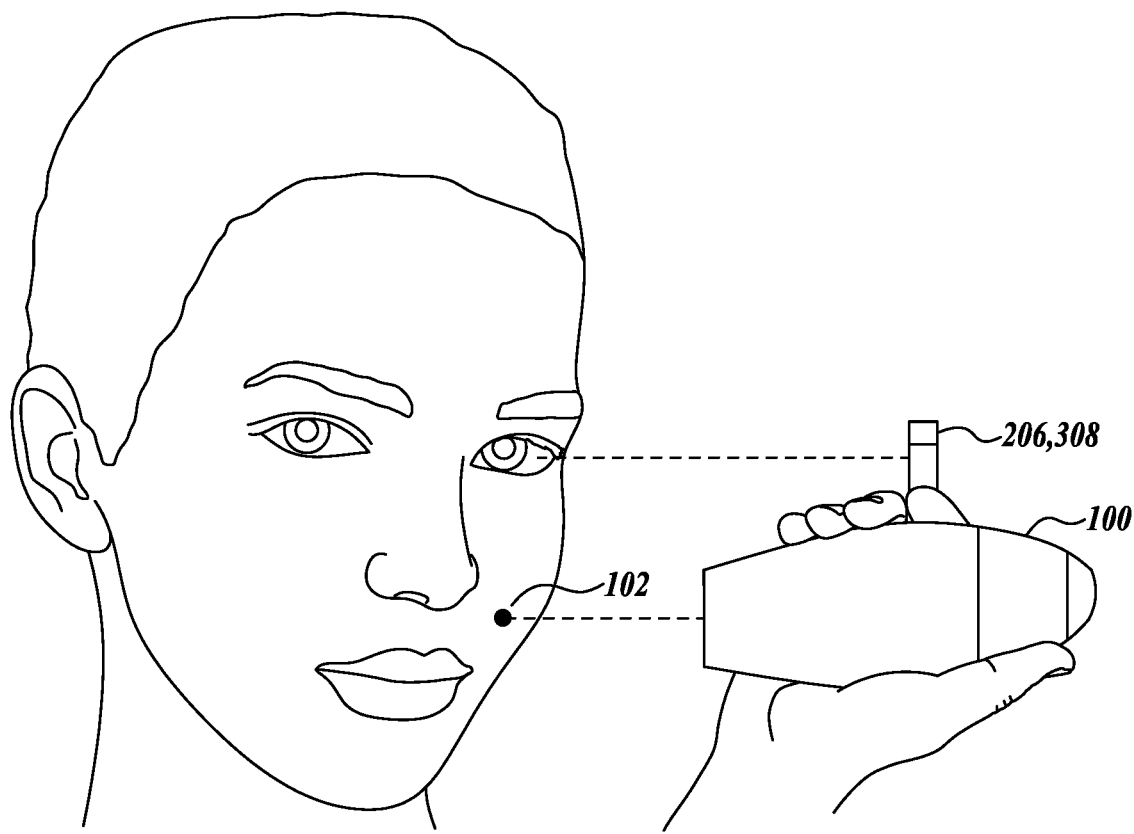
FIG. 1 is a diagrammatical illustration of a hand-held dispenser device including a camera and viewfinder used for a dispensing application.

FIG. 1 is a diagrammatical illustration of an embodiment of a hand-held dispenser device 100 including at least a dispensing nozzle, a camera, and a viewfinder. In one embodiment, the dispenser device 100 is used for dispensing one or more formulations onto a skin condition 102, such as a skin blemish, pimple, dark spot, wrinkle, and the like. In one embodiment, the dispenser device 100 is used for applying cosmetics or lotions. The dispensing device 100 includes a camera and viewfinder to allow the user to view the skin condition 102 before or during the dispensing of the formulation. The dispenser device 100 according to the disclosure enables the user to precisely point the dispenser device 100 to treat the desired area and skin condition 102.

A dispenser device 100 includes any device that is used for applying one or more formulations. Formulations are dispensed in any form including liquids, solids, gels, emulsions, gases, or any combination thereof. Formulations are dispensed using any type of dispensing technology, including manual pumping, automated pumps, nebulizers, and the like.

"Hand-held" as it pertains to the dispenser device indicates a device that is small enough to be operated while being manually held up by the user, the device does not sit stationary during dispensing, and the device is maneuvered into position while being held by the user.

As used herein, "camera" is any system that receives light from the dispensing zone, and then forms an image using the light, and transmits the image to a viewfinder. A camera may include one or more optical components, including those that transmit light, such as lenses, and those that reflect light, such as mirrors. Further optical components include filters, prisms, polarizers, beamsplitters, and the like. The camera may also include electrical components including image sensors, and image processors. Image sensors are composed of pixels where each pixel generally has a photodetector and transistors. A function of a pixel is to convert light into a digital signal. There are well-known technologies used in image sensor, such as CMOS and CCD sensors. CCD and CMOS sensors have been used in digital camera technologies.

Image processors perform a variety of tasks on the digital signals sent by the image sensor. Image processors adjust for color, noise reduction, and sharpen the image. In an embodiment, an auto-focusing feature is incorporated within the image processor.

In one embodiment, the camera is provided with an auto-focus feature. An auto-focus feature includes sensors configured to control an electromechanical system. The electromechanical system controls the focus point of the lens that sets the focus of the optical system.

Figure 2:
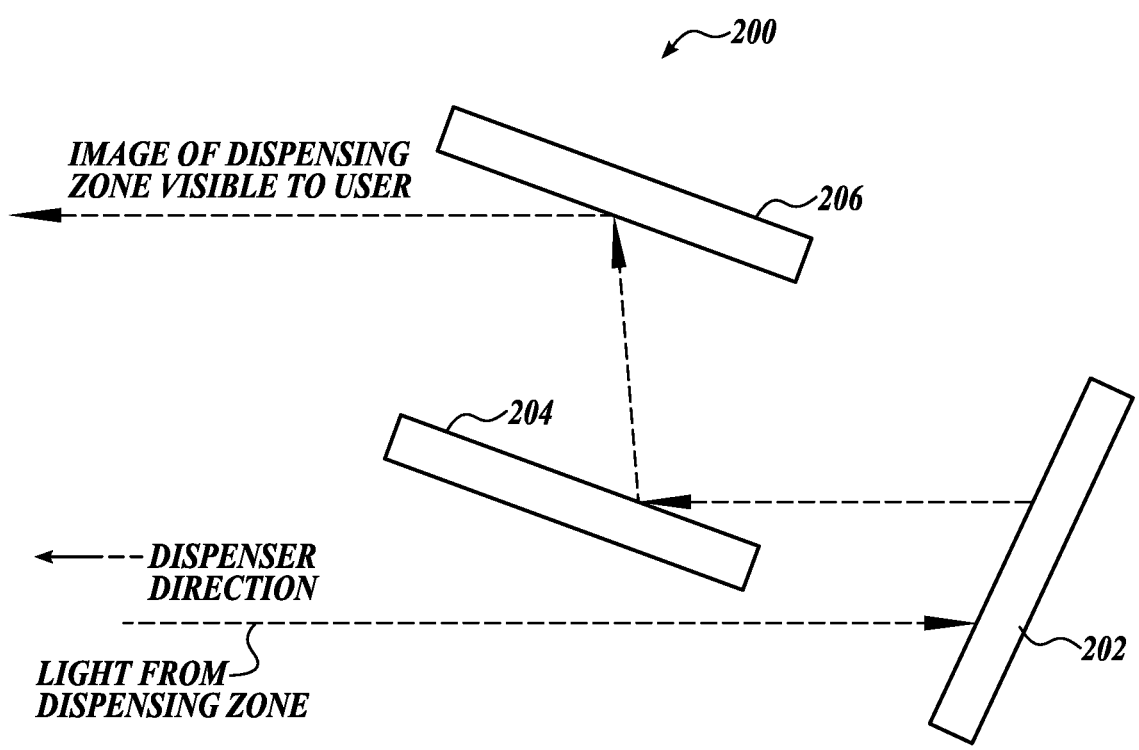
FIG. 2 is a schematic illustration of one embodiment of a camera and viewfinder for a hand-held dispenser device.

FIG. 2 is an illustration of one embodiment of an optical system 200 including a camera and viewfinder. In FIG. 2, a simple camera may include at least one mirror 202 oriented to gather light coming from the direction toward which the dispensing nozzle is pointing. In embodiments, the dispenser device 100 has a dispensing nozzle, wherein the dispensing nozzle is oriented in the dispenser device 100 to have a predefined dispensing direction. The camera including the mirror 202 is oriented in the dispenser device 100 to gather the light coming from the same direction as the dispensing direction, i.e., the light from the dispensing zone. In the embodiment of FIG. 2, the light from mirror 202 is then reflected to a second mirror 204. The light from the mirror 204 is reflected to a third mirror 206. The mirror 206 functions as the viewfinder. The light and the image collected from mirror 202 is reflected from the third mirror 206 in a direction that the user easily sees. Therefore, the user is able to clearly see the dispensing zone at which the dispensing nozzle is being pointed toward.

Figure 3:
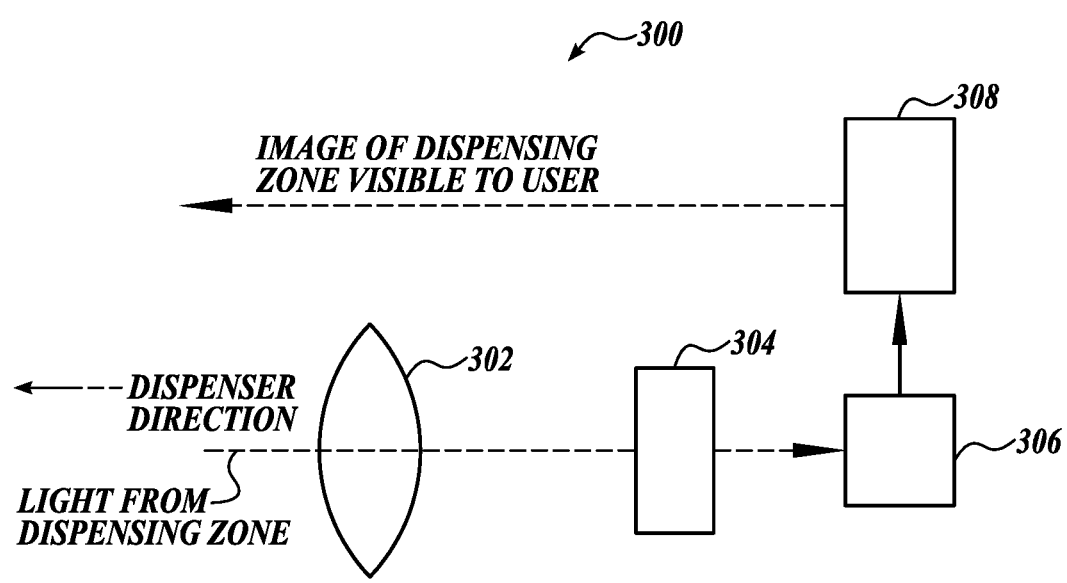
FIG. 3 is a schematic illustration of one embodiment of a camera and viewfinder for a hand-held dispenser device.

FIG. 3 is an illustration of one embodiment of an optical system 300 including a camera and viewfinder. In FIG. 3, a camera includes a lens 302, an image sensor 304, an image processor 306, and an electronic display 308 functions as the viewfinder. In FIG. 3, the camera may include at least one lens 302 oriented to gather light coming from the direction toward which the dispensing nozzle is pointing. In embodiments, the dispenser device 100 has a dispensing nozzle, wherein the dispensing nozzle is oriented in the dispenser device 100 to have a predefined dispensing direction. The camera including the lens 302 is oriented in the dispenser device 100 to gather the light coming from the same direction as the dispensing direction, i.e., the light from the dispensing zone. In the embodiment of FIG. 3, the light from lens 302 is focused onto an image sensor 304. The image sensor 304 converts the light into electric digital signals that are then processed by the image processor 306. The image processor 306 sends the converted signals to an electronic display device 308, which then displays the image of the dispensing zone. Images are displayed as still images or as a video stream. The display device 308 functions as the viewfinder. The viewfinder 308 allows the user to easily view the image collected from the lens 302. Therefore, the user is able to clearly see the dispensing zone at which the dispensing nozzle is being pointed toward. In one embodiment, the viewfinder (display device 308) may be placed on a movable swing-arm attached to the dispenser device 100, so that as the dispenser device 100 is moved further to the side of the face and even the back of the head, the user will be able to separate the viewfinder from the dispenser device 100 and move the viewfinder (display device 308) to allow viewing.

Figure 4:
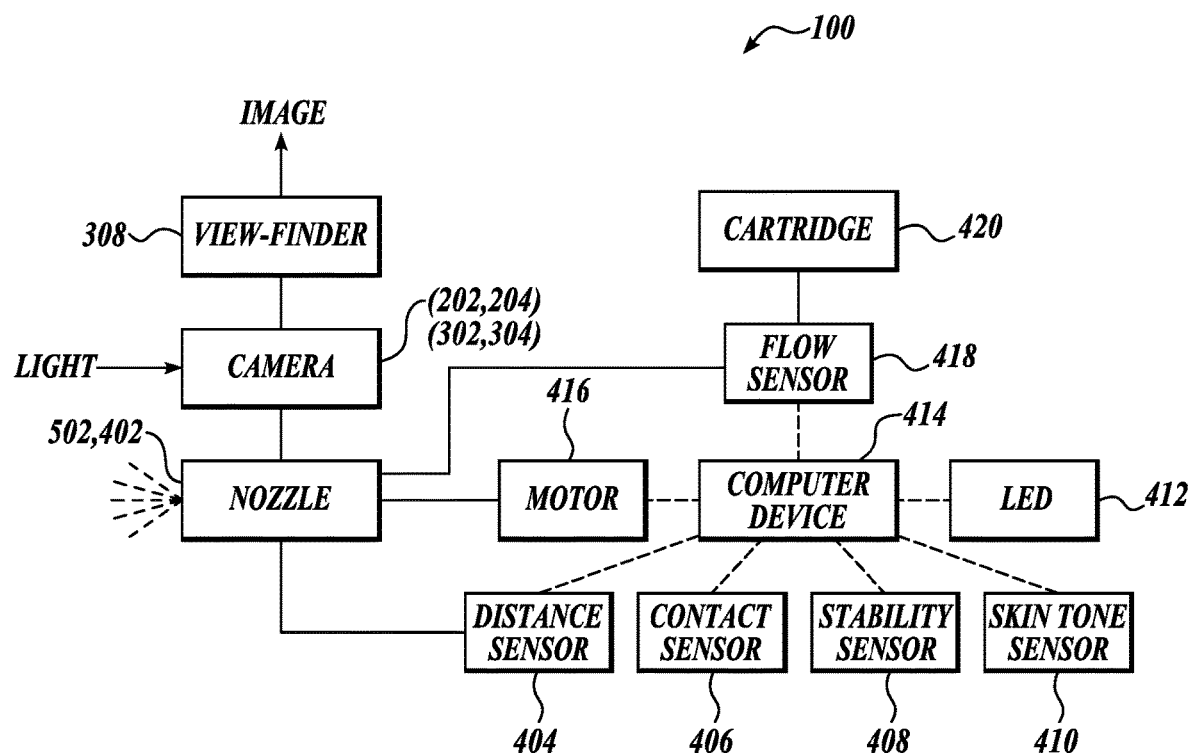
FIG. 4 is a schematic illustration of one embodiment of a hand-held dispenser device including a camera, viewfinder, sensors, and a controller.

FIG. 4 is a schematic illustration of one embodiment of the dispenser device 100. The dispenser device includes the dispensing nozzle 402. As described herein, the dispensing nozzle 402 is used for dispensing one or more formulations in any form including liquids, solids, gels, emulsions, gases, or any combination thereof. Formulations are dispensed using any type of dispensing technology, including manual pumping, any aerosolized solid or liquid via high frequency oscillation, automated pumps, and the like. The dispensing nozzle also includes delivery devices, such as needles, or LEDs for light therapy.

In one embodiment, the dispensing nozzle 402 includes an electrically driven pump or actuator, such a piezoelectric nebulizer that generates a spray. FIGS. 5A and 5B are illustrations showing one embodiment of the dispensing nozzle 402 and dispensing actuator, such as a pump or piezoelectric component. In the embodiment, the dispensing nozzle 402 is placed within a motor nest 502 that swivels in one or more axes to change the direction of the spray from the dispensing nozzle 402. The motor nest 502 is connected to a motor 416 to move the motor nest 502 and the angle of the dispensing nozzle 402.

Figure 6:
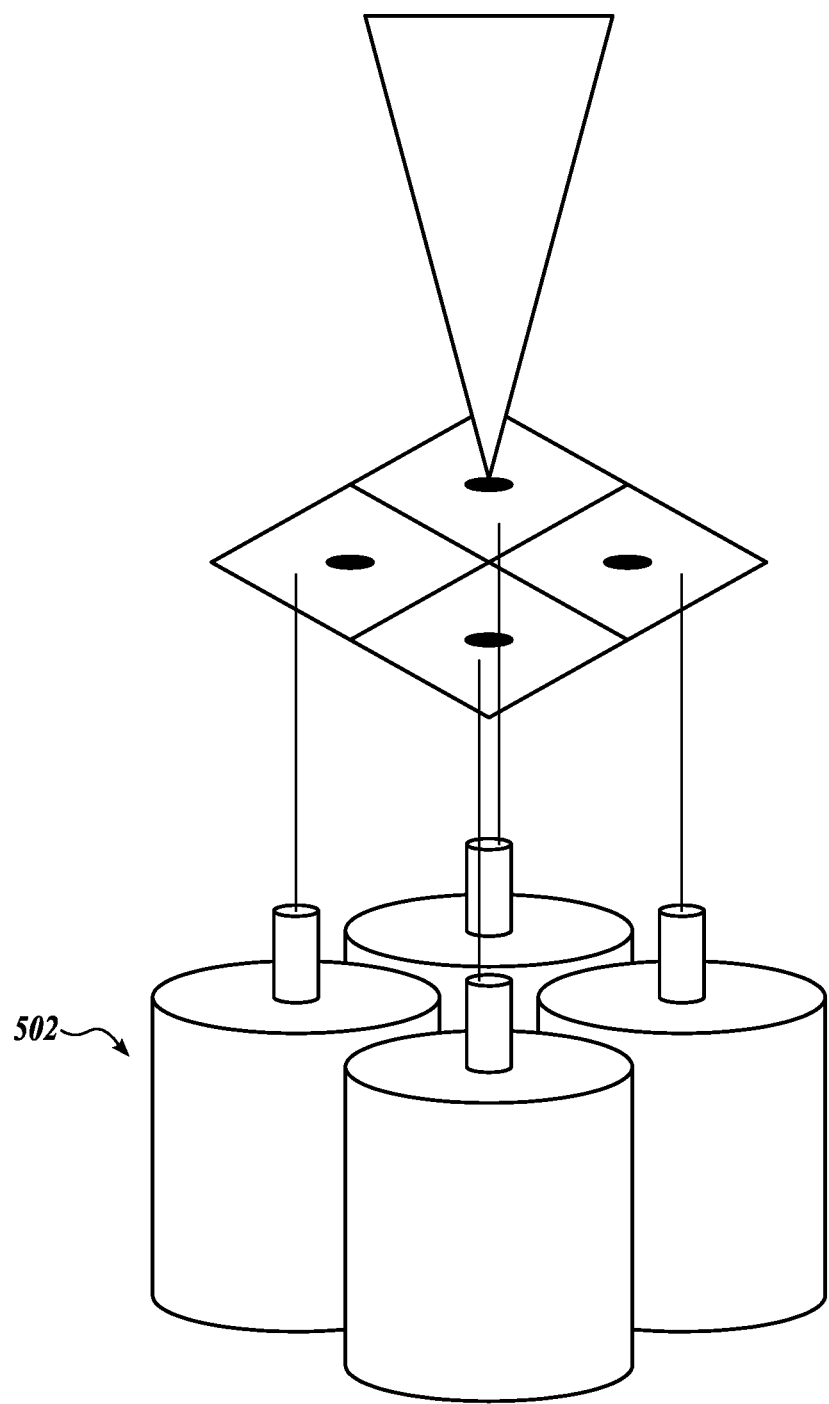
FIG. 6 is a schematic illustration of one embodiment of a dispensing nozzle.

FIG. 6 is one embodiment of a dispensing nozzle 502. In the embodiment, the dispensing nozzle 502 includes a plurality of nozzles that may each be actuated independently of the others. Each nozzle has dispensing actuator, such as a pump or piezoelectric component. In an embodiment, the plurality of nozzles are actuated simultaneously. In an embodiment, the plurality of nozzles are actuated in series or any two or more are actuated simultaneously or in series. The embodiment of FIG. 6 applies more than two formulations, each from a different nozzle, or applies the same formulation from each nozzle to cover a wider area. The dispensing nozzles 402 and 502 are controlled via a computer device.

In one embodiment, the dispensing nozzle 402 is fixed in position within the dispenser device 100 such that the dispenser device 100 is pointed toward a predefined direction, and the camera (202, 204 or 302, 304) is also oriented to capture light coming from the predefined direction or dispensing zone. In one embodiment, the dispensing nozzle 402 is mounted on a swivel that allows the dispensing nozzle 402 to be moved by a motor 416 in relation to the dispenser device 100, thus moving the dispensing direction without having to move the dispenser device 100. When the dispensing nozzle 402 is capable of moving independently of the dispenser device 100, the camera (202, 204 or 302, 304) is mounted on the same motor nest as the dispensing nozzle 402 so that the camera (202, 204 or 302, 304) continually points in the same direction as the nozzle 402 dispensing direction so that the camera (202, 204 or 302, 304) is able to receive the light from the dispensing zone and create an image. As described herein, the camera (202, 204 or 302, 304) is able to transmit the image or light to be displayed on the viewfinder 206 or 308 which is viewable by the user.

In one embodiment, the dispenser device 100 includes one or more formulation cartridge 420 containing the formulation to be dispensed via the dispensing nozzle 402.

In one embodiment, the amount of flow from the formulation cartridge 420 to the dispensing nozzle 402 is monitored through a flow sensor 418.

In one embodiment, the dispenser device 100 includes a distance sensor 404. The distance sensor 404 functions to determine the distance from the end of the dispensing nozzle 402 to the surface on which the formulation is being applied, such as skin. In an example, the at least one distance sensor is selected from the group consisting of infrared, acoustic, ultrasound, conductance, dielectric, capacitance, electrochemical, fluorescence, force, heat, thermocouple, thermistor, interdigital, optical, physiological, and inductive sensors, or any combination thereof.

In one embodiment, the dispenser device 100 includes a contact sensor 406. The contact sensor 406 functions to determine whether, for example, the dispensing nozzle 402 is in contact with skin. Contact with skin may be required for applying some formulations. In an example, the contact sensor 406 is selected from the group consisting of infrared, acoustic, ultrasound, conductance, dielectric, capacitance, electrochemical, fluorescence, force, heat, thermocouple, thermistor, interdigital, optical, physiological, and inductive sensors or any combination thereof.

In one embodiment, the dispenser device 100 includes a stability sensor 408. The stability sensor 408 functions to determine whether the dispenser device 100 is being held steady, i.e., with minimal movement so as to be able to accurately dispense the formulation at the intended appropriate skin surface. In an example, the stability sensor 408 is selected from stability sensors including but not limited to an accelerometer, gyroscope, hall-effect magnetic sensor or any combination thereof.

In one embodiment, the dispenser device 100 includes a skin tone sensor 410. The skin tone sensor 410 functions to determine an area on the skin desired to be treated with the formulation. The skin tone sensor 410 is used to determine a skin condition, for example, pimples, dark spots, wrinkles, or other skin condition desired to be treated. In an example, the skin tone sensor 410 includes an optical sensor. An optical sensor measures reflectance of a skin surface in comparison to the reflectance of the surrounding skin surface to identify a skin condition, or the optical sensor measures a particular wavelength of light being reflected off the skin surface in comparison to the surrounding skin surface that indicates a skin condition.

In one embodiment, the dispenser device 100 includes a light 412, such a light emitting diodes. In one embodiment, the light emitting diodes light the dispensing zone intended for treatment. In one embodiment, the light emitting diodes 412 emit a particular wavelength or wavelengths of light, the reflectance of which is measured by the skin tone sensor 410.

In one embodiment, the dispenser device 100 includes a computer device 414. In one embodiment, the computer device 414 includes a central processor and system memory. The system is a volatile or nonvolatile memory, such as read only memory ("ROM"), random access memory ("RAM"). The computer device 414 stores instructions as hardware circuitry or software or both. The instructions when executed by the computer device 414 cause the dispenser device 100 to operate according to predetermined logic as a series of steps.

In one embodiment, the computer device 414 communicates with the components including the nozzle 402, the motor 416, the flow sensor 418, the distance sensor 404, the contact sensor 406, the stability sensor 408, the skin tone sensor 410, and the light 412.

In one embodiment, the formulation cartridge includes a RFID tag or other memory chip that provides instructions on how the formulation is to be applied. The computer device 414 is able to read the instructions from the formulation cartridge 420 and then execute the instructions as a series of steps.

In one embodiment, the instructions provide for the dispensing nozzle 402 to be within a predetermined distance to the skin surface before dispensing of the formulation. In the embodiment, the computer device 414 receives a signal from the distance sensor 404 indicating that the dispensing nozzle 402 is within the predetermined distance, and then the computer device 414 either allows the user to depress a trigger to dispense the formulation or the computer device 414 actuates the dispensing nozzle 402 to automatically dispense the formulation. In one embodiment, the computer device 414 allows the dispensing of the formulation as long as the dispensing nozzle 402 is within the predetermined distance, and will stop dispensing when the dispensing nozzle 402 moves out of the predetermined distance.

In one embodiment, the instructions provide for the dispensing nozzle 402 to be in contact with the skin surface before dispensing of the formulation. In the embodiment, the computer device 414 receives a signal from the contact sensor 406 indicating that the dispensing nozzle 402 is in contact with the skin surface, and then the computer device 414 either allows the user to depress a trigger to dispense the formulation or the computer device 414 actuates the dispensing nozzle 402 to automatically dispense the formulation. In one embodiment, the computer device 414 allows the dispensing of the formulation as long as the dispensing nozzle 402 is in contact with the skin surface, and will stop dispensing when the dispensing nozzle 402 moves out of contact from the skin surface.

In one embodiment, the instructions provide for the dispenser device 100 to detect a particular skin tone. In the embodiment, the computer device 414 receives a signal from the skin tone sensor 410 indicating that the dispensing nozzle 402 is pointed to the skin condition of the desired skin tone, and then the computer device 414 either allows the user to depress a trigger to dispense the formulation or the computer device 414 actuates the dispensing nozzle 402 to automatically dispense the formulation. In one embodiment, the computer device 414 allows the dispensing of the formulation when the skin tone that is the target of the formulation is being detected by the skin tone sensor 410. In one embodiment, the computer device 414 allows the dispensing of the formulation as long as the target skin tone is being detected, and will stop dispensing when the target skin tone is no longer detected.

In one embodiment, the instructions provide for the dispenser device 100 to be in a stable condition meeting a minimal movement threshold before dispensing of the formulation. In the embodiment, the computer device 414 receives a signal from the stability sensor 408 indicating that the dispenser device 100 meets a minimal movement threshold, and then the computer device 414 either allows the user to depress a trigger to dispense the formulation or the computer device 414 actuates the dispensing nozzle 402 to automatically dispense the formulation. In one embodiment, the computer device 414 allows the dispensing of the formulation as long as the dispenser device 100 is stable meeting the minimal movement threshold, and will stop dispensing when the dispenser device exceeds the minimal movement threshold.

In one embodiment, the instructions provide for the dispenser device 100 to dispense a predetermined amount of formulation. In the embodiment, the computer device 414 receives a signal from the flow sensor 418 indicating a running total of the amount of formulation being dispensed, and then the computer device 414 will stop dispensing when the target flow amount is dispensed.

In one embodiment, the dispenser device 100 includes more than one formulation cartridge 420, and the instructions provide for the dispenser device 100 to dispense formulations simultaneously or in series.

In one embodiment, the skin tone sensor 410 provides the computer device 414 with a direction of the skin condition to be treated, and then the computer device 414 commands the motor 416 to point the dispensing nozzle 402 at the skin condition. As the dispenser device 100 is being held by the user, the dispensing device 100 can experience movements, and the skin tone sensor 410 continually provides the location of the skin condition, and the computer device 414 continually commands the motor 416 to keep the dispensing nozzle 402 pointed at the skin condition being treated.

In one embodiment, the instructions provide for one sensor to detect a condition for dispensing the formulation. In one embodiment, the instructions provide for two or more sensors to each detect a condition for dispensing the formulation. For example, the flow sensor 418 is coupled with the distance sensor 404, the contact sensor 406, the stability sensor 408, or the skin tone sensor 410. In the embodiment, if either the flow sensor 418 or any one of the distance sensor 404, the contact sensor 406, the stability sensor 408, and the skin tone sensor 410 detect a condition that allows for dispensing, the dispenser device 100 will dispense formulation until at least one sensor does not detect the condition allowing dispensing.

In another embodiment, the stability sensor 408 is coupled with the distance sensor 404, the contact sensor 406 or the skin tone sensor 410. In the embodiment, the disperser device 100 permits dispensing when the stability sensor 408 detects a condition that allows dispensing and at least one of the distance sensor 404, the contact sensor 406 or the skin tone sensor 410 also detects a condition that allows dispensing. When either the stability sensor 408 or any one of the distance sensor 404, the contact sensor 406 or the skin tone sensor 410 fails to sense a condition allowing dispensing, then the dispenser device does not permit dispensing.

In one embodiment a dispenser device 100 comprises a dispensing nozzle 402, 502, wherein the dispensing nozzle is configured to point toward a dispensing direction; a camera (202, 204 or 302, 304) configured to receive an image of a dispensing zone that the dispensing nozzle points toward; and a viewfinder 206 or 308 that displays the image of the dispensing zone that the dispensing nozzle points toward.

In one embodiment, the camera includes one or more mirrors (202, 204) that reflect the image to the viewfinder 206.

In one embodiment, the viewfinder 206 includes a mirror or a lens.

In one embodiment, the camera includes a lens 302 and an image sensor 304 that converts light into electronic signals, and the viewfinder 308 includes an electronic display that displays the image created from the image sensor.

In one embodiment, the dispenser device 100 further comprises an automated focusing camera 306.

In one embodiment, the dispenser device 100 further comprises a motor 416 connected to the dispensing nozzle 402, the motor is actuated to change a direction of the dispensing direction.

In one embodiment, the dispenser device 100 further comprises a plurality of dispensing nozzles 502, and the plurality of dispensing nozzles are actuated independently or any two or more simultaneously or in series.

In one embodiment, the dispenser device 100 further comprises one or more lights 412 to illuminate the dispensing zone.

In one embodiment, the dispenser device 100 further comprises a sensor 404 that determines a distance of the dispensing nozzle to the dispensing zone.

In one embodiment, the dispenser device 100 further comprises a sensor 406 that determines skin contact with the dispenser device.

In one embodiment, the dispenser device 100 further comprises a sensor 408 that determines a stability of the dispenser device is within a minimal movement threshold.

In one embodiment, the dispenser device 100 further comprises a sensor 410 that determines a skin tone in the dispensing zone.

In one embodiment, the dispenser device further comprises a flow sensor 418 that determines an amount of a formulation being dispensed.

In one embodiment, the dispensing zone is an area of skin surface including a skin condition 102.

In one embodiment, the skin condition includes a dark spot, skin wrinkle, or pimple.

In one embodiment, the viewfinder 308 displays a video stream of the dispensing zone.

While illustrative embodiments have been illustrated and described, it will be appreciated that various changes can be made therein without departing from the spirit and scope of the invention.

The embodiments of the invention in which an exclusive property or privilege is claimed are defined as follows:

1. A dispenser device, comprising:
   a dispensing nozzle on a side of the dispensing device, wherein the dispensing nozzle is configured to point toward a dispensing direction;
   one or more reflective surfaces configured to receive light of an image of a dispensing zone that is gathered from the same direction as the dispensing nozzle, wherein the light is reflected within the dispenser device to a viewfinder, the light exiting the viewfinder on the side of the dispenser device where the dispensing nozzle is located; and
   the viewfinder displays the image of the dispensing zone that the dispensing nozzle points toward.

2. The dispenser device of claim 1, wherein the camera includes one or more mirrors that reflect the image to the viewfinder.

3. The dispenser device of claim 2, wherein the viewfinder includes a mirror or a lens.

4. The dispenser device of claim 1, further comprising a motor connected to the dispensing nozzle, the motor is actuated to change a direction of the dispensing direction.

5. The dispenser device of claim 1, comprising a plurality of dispensing nozzles, and the plurality of dispensing nozzles are actuated independently or any two or more simultaneously or in series.

6. The dispenser device of claim 1, comprising one or more lights to illuminate the dispensing zone.

7. The dispenser device of claim 1, comprising a sensor that determines a distance of the dispensing nozzle to the dispensing zone.

8. The dispenser device of claim 1, comprising a sensor that determines skin contact with the dispenser device.

9. The dispenser device of claim 1, comprising a sensor that determines a stability of the dispenser device is within a minimal movement threshold.

10. The dispenser device of claim 1, comprising a sensor that determines a skin tone in the dispensing zone.

11. The dispenser device of claim 1, comprising a flow sensor that determines an amount of a formulation being dispensed.

12. The dispenser device of claim 1, wherein the dispensing zone is an area of skin surface including a skin condition.

13. The dispenser device of claim 12, wherein the skin condition includes a dark spot, skin wrinkle, or pimple.

14. The dispenser device of claim 1, wherein the viewfinder displays a video stream of the dispensing zone.

\* \* \* \* \*